Figure 1:
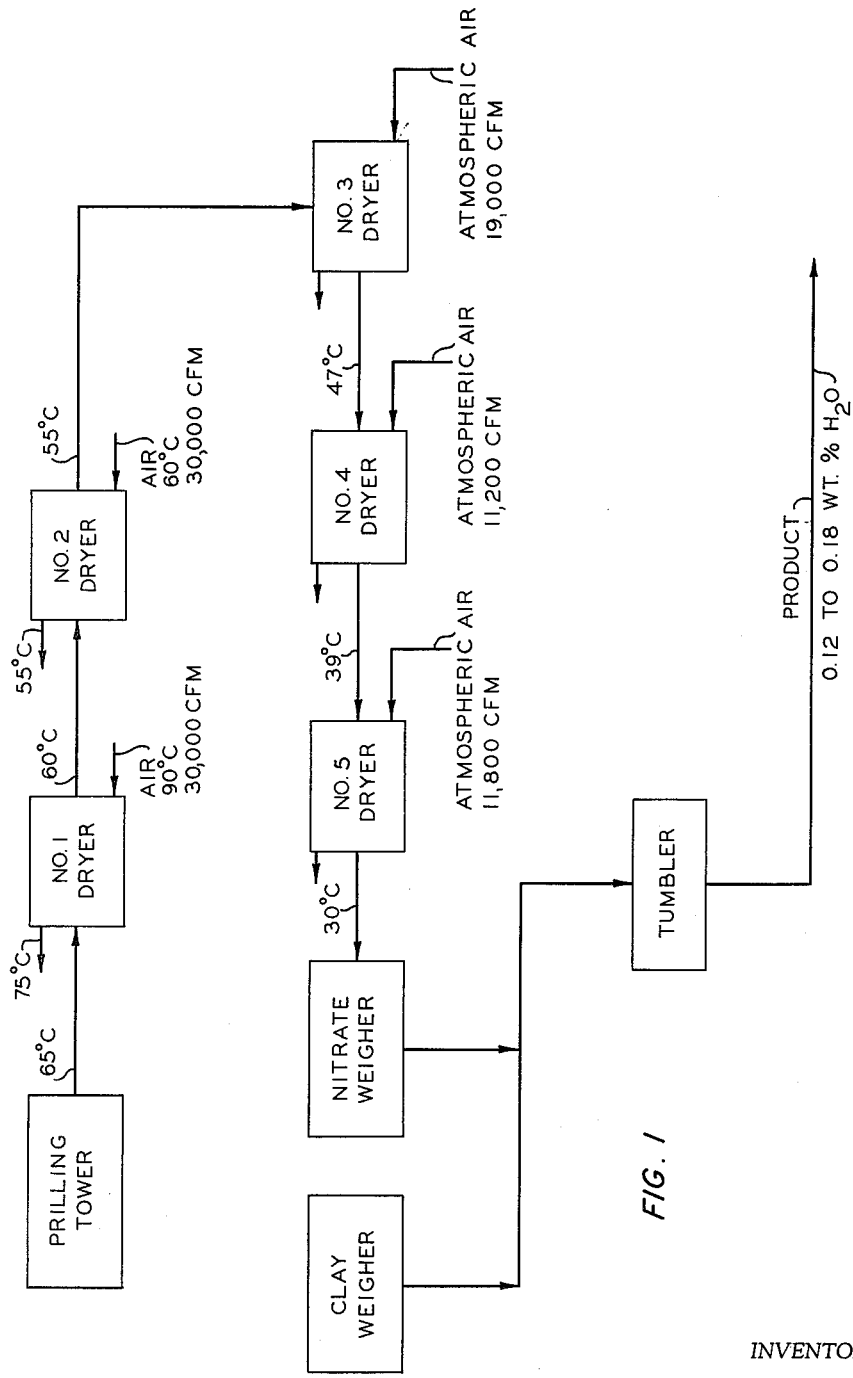

United States Patent Office 3,261,105
Patented July 19, 1966

3,261,105
DRYING AMMONIUM NITRATE PRILLS
Charles V. Mullen, Jr., Idaho Falls, Idaho, assignor to Phillips Petroleum Company, a corporation of Delaware
Filed Oct. 29, 1962, Ser. No. 233,674
5 Claims. (Cl. 34—13)

This invention relates to a process for drying ammonium nitrate prills. In one aspect it relates to a sequence of steps performed on the prills received from the prilling tower so as to remove moisture therefrom more completely than has heretofore been possible or practical. In another of its aspects the invention relates to apparatus for drying ammonium nitrate prills.

In the preparation of solid ammonium nitrate by the so-called prilling process the product received from the prilling tower exists as granular ammonium nitrate containing water in the form of a saturated ammonium nitrate solution. Ammonium nitrate exists in several crystal forms and 84.2° C. is the transition temperature from rombic (32.1 to 84.2° C.) to monoclinic (84.2 to 125.2° C.). It has been common practice in the prior art to impose an upper limit of 84° C. prill temperature during the drying process to avoid crossing the critical transition temperature which is slightly above 84° C. because of the tendency for the prills to break down as a result of the volume change in the individual crystals at such transition from one crystalline form to another. Various drying techniques have been proposed for drying the ammonium nitrate prills in an effort to dry the prills from the center to the outer surface so as to avoid entrapment of moisture within the prills. Because of the hygroscopic nature of ammonium nitrate it is considered necessary to remove as much as possible of the moisture within the prills during the drying operation after which the prills are usually coated with a material such as clay so as to avoid re-entry of moisture to the prills.

I have found that ammonium nitrate prills recovered from the bottom of the prilling temperature can be rapidly and effectively dried and simultaneously cooled by dropping the temperature of the prills up to about 10 degrees in each stage of a multiple stage drying operation. I have also found that atmospheric air can advantageously be utilized for the drying operation. This is a considerable advantage because heretofore it has been considered necessary to control the relative humidity of the drying air. The atmospheric air should be heated prior to passage through the initial drying stages so that a sufficient amount of air can be passed in contact with the prills to carry away the released moisture without reducing the prill temperature more than about 10° C. in each drying stage. After the temperature of the prills has been reduced about 10–20° C., atmospheric air at ambient temperature can be employed. The invention is not limited to the use of atmospheric air and air of controlled humidity can be used if desired. Furthermore, other drying gases can be used since the function of the drying gas is to control the rate of cooling of the prills and to carry away the moisture released from the prills. Gases such as nitrogen, hydrogen, helium, natural gas, and ammonia can be used, however atmospheric air is preferred because of availability and economics.

It is an object of the present invention to provide a sequence of steps for the drying of ammonium nitrate prills whereby a greater amount of moisture will be removed from the prills than has been done in the prior art. Another object of the invention is to provide a method for drying ammonium nitrate prills wherein the prills are simultaneously dried and cooled. Still another object of the invention is to provide a method for drying ammonium nitrate prills with atmospheric air. Another object of the invention is to provide an apparatus for increasing the moisture removal from ammonium nitrate prills. The provision of an apparatus for simultaneously drying and cooling ammonium nitrate prills is also an object of this invention. Other objects and advantages of the invention will be apparent to those skilled in the art upon reading the disclosure of this invention.

FIGURE 1 of the drawing is a schematic flow diagram of a preferred embodiment of my invention.

Figure 2:
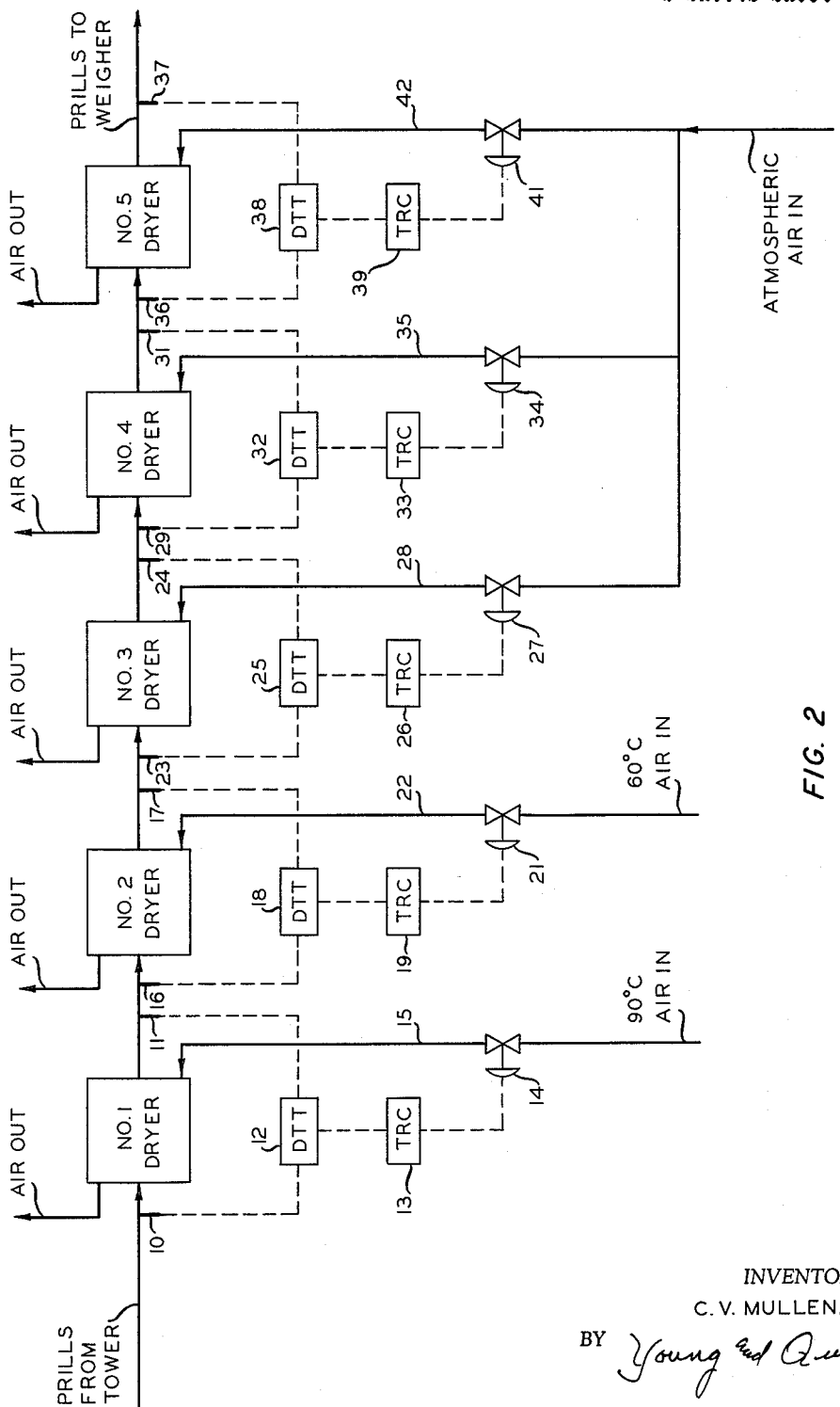

FIGURE 2 is a schematic flow diagram of a system of controls which can be used in the embodiment of FIGURE 1.

In the past it has been common to heat the prills in the dryers or at least to keep the prills at a constant temperature through the dryers which usually comprise the first two stages of the drying and cooling operation. Prills were usually fairly dry coming out of the first drying stages but it was then very difficult to reduce the moisture content further in successive drying and cooling steps. According to the practice of the invention, the prills are received from the prilling tower at a temperature usually in the range of about 60 to 75° C. and the temperature of the prills is then reduced about 2 to 10° C. in each of the drying and cooling stages. The preferred temperature drop through the initial drying stages, where the moisture removal is greatest, e.g., the No. 1 and No. 2 dryers, is about 4 to 7° C. because the greatest ultimate moisture removal is obtained in this range. Operation according to the present invention reduces the moisture of the prills leaving the final stage to about 0.1 weight percent moisture as compared to prior art processes wherein the moisture content of the prills from the final drying stage was about 0.2 to about 0.5 weight percent. This is surprising because the prills leaving the No. 1 and No. 2 drying stages, in the practice of the invention, contain more moisture than do the prills leaving the Nos. 1 and 2 drying stages according to prior art processes. However, in test runs and actual plant operation it has been demonstrated repeatedly that the prills leaving the final stage, according to invention, are dryer than those leaving the final stage of the prior art processes. It is believed that moisture migrates to the prill surface more readily if the prill is cooled because the vapor pressure of the moisture is highest where prill temperature is highest. If the prills are heated in the dryer stages, the surface of the prill, at least initially, will be hotter than the center and the external vapor pressure will be higher than the internal vapor pressure, thus tending to prevent escape of moisture from the prills. When the prills are being cooled, the prill surface is cooler than the center so that the vapor pressure is greater at the center of the prill than at the surface and the moisture can migrate through and from the prills easily. Whether or not the above theoretical considerations are correct, I have found that dryer prills are obtained with the expenditure of less time and less energy by dropping the temperature of the prills at a controlled rate throughout the drying and cooling process.

I have further found that prill degradation is substantially decreased according to the practice of my invention as evidenced by a substantial decrease in the amount of fines removed from the drying stages.

The following examples will be helpful in attaining a full understanding of the invention; however, the examples are by way of illustration and should not be construed as unduly limiting the claims. FIGURE 1 of the drawing shows, diagrammatically, the means for carrying out my invention, including the essential conditions in the various stages of the operation. The prills are received from the prilling tower and passed to the first dryer stage at 65° C., exit the first dryer stage at 60° C., exit the second dryer stage at 55° C., exit the third dryer stage at 47° C., exit the fourth dryer stage at 39° C., and exit the final dryer stage at 30° C. In the prior art process the first two stages were the dryers and the last three stages were the coolers. Atmospheric air is heated to 90° C. and passed through the first drying stage in an amount sufficient to reduce the temperature of the prills 5° C. and exits the first drying stage at a temperature of 75° C. Atmospheric air is heated to 60° C., passed through the second drying stage in an amount sufficient to reduce the temperature of the prills 5° C. and exists the second stage at 55° C. Atmospheric air (unheated) is passed through the remaining drying and cooling stages in amounts sufficient to reduce the temperature of the prills to that shown at the exit of each stage. The dried prills are then mixed with clay in the conventional manner to produce the final product having a moisture content of 0.12 to 0.18 weight percent. The clay coating contributes from 0.06 to 0.1 weight percent moisture. Thus the moisture content of the prills leaving the final drying and cooling stage is about 0.1 or less.

The amount of fines removed from the No. 2 dryer was reduced from about 5–15 weight percent of the prills passing through to about 3–7 weight percent, according to the practice of the invention.

The result of tests on the prills at various points in the process during operation according to the process of the prior art and according to the process of the invention are shown in the following Table I.

TABLE I

| Run No. | Prill Temperature, ° C. | | | Prill Moisture, Weight Percent | | | | | |
| --- | --- | --- | --- | --- | --- | --- | --- | --- | --- |
| | Tower Exit | #1 Dryer Exit | #2 Dryer Exit | #1 Dryer Exit | #2 Dryer Exit | #3 Dryer Exit | #4 Dryer Exit | #5 Dryer Exit | Product |
| 1 | 65 | 70 | 75 |  | 0.62 | 0.35 | 0.31 | 0.21 | 0.26 |
| 2 | 65 | 70 | 75 | 1.58 | 0.89 |  |  |  |  |
| 3 | 65 | 60 | 58 | 2.01 | 0.50 | 0.25 | 0.18 | 0.10 | 0.10 |
| 4 | 70 | 65 | 57 | 2.24 | 0.87 |  |  |  | 0.10 |

In the above Table I it can be seen that the moisture content of the prills exiting the No. 1 dryer is much higher according to the practice of the invention, however the rate at which moisture is removed from the prills in the succeeding stages is much higher according to the practice of the invention. The final moisture content of the prills according to the practice of the invention is only about 50 percent of that of the prior art.

In another series of runs temperature differences were varied and typical results are shown in the following Table II.

TABLE II

| Run No. | Prill Temperature, ° C. | | | Prill Moisture, Weight Percent |
| --- | --- | --- | --- | --- |
| | Tower Exit | #1 Dryer Exit | #2 Dryer Exit | #5 Dryer Exit |
| 1A | 65 | 63 | 57 | 0.10 |
| 2A | 66 | 66 | 57 | 0.11 |
| 3A | 69 | 69 | 71 | 0.15 |
| 4A | 68 | 73 | 77 | 0.16 |

The above results show that a small temperature drop through the dryer stages will provide the desired moisture removal but that even a small temperature rise in the drying stages causes a marked increase in residual moisture in the prills.

A preferred system of controls for operating the process illustrated in FIGURE 1 is shown in FIGURE 2. Thermocouple 10 measures the temperature of the prills passing from the prilling tower to the No. 1 dryer and thermocouple 11 measures the temperature of the prills leaving No. 1 dryer. Thermocouples 10 and 11 are connected to transmitter 12 which can be a differential temperature transmitter or transducer adapted to transmit the temperature differential between the prills entering and exiting the No. 1 dryer to temperature recording controller 13 which in turn is connected to motor valve 14 in conduit 15 so as to control the volume of air, heated to a constant temperature, passing through the No. 1 dryer in order to maintain the desired temperature differential of the prills entering and exiting the No. 1 dryer. Alternatively, the volume of heated air can be maintained constant and controller 13 can be utilized to vary or control the temperature of the air, e.g., by controlling the amount of steam to a heat exchanger which heats the stream of air passing therethrough. Similarly, controller 13 can be utilized to control the fuel to a furnace which heats the air stream.

Substantially identical control systems maintain a predetermined temperature differential of the prills entering and exiting dryers 2, 3, 4, and 5. Thermocouples 16 and 17 measure the temperatures of the prills entering and exiting dryer No. 2 and are connected to differential temperature transmitter 18 which is connected to temperature recording controller 19 which in turn is connected to motor valve 21 in conduit 22.

Thermocouples 23 and 24 measure the temperatures of the prills entering and exiting No. 3 dryer and are connected to differential temperature transmitter 25 which is connected to temperature recording controller 26 which in turn is connected to motor valve 27 in conduit 28.

Thermocouples 29 and 31 measure the temperatures of the prills entering and exiting No. 4 dryer and are connected to differential temperature transmitter 32 which is connected to temperature recording controller 33 which in turn is connected to motor valve 34 in conduit 35.

Thermocouples 36 and 37 measure the temperatures of the prills entering and exiting No. 5 dryer and are connected to differential temperature transmitter 38 which is connected to temperature recording controller 39 which in turn is connected to motor valve 41 in conduit 42.

The differential temperature transmitters which are used in carrying out the present invention are commercially available; for example, 12, 18, 25, 32, and 38 can be differential temperature transmitter such as shown in U.S. 3,018,229, issued January 23, 1962. Temperature recording controllers such as indicated at 13, 19, 26, and 39 are well known in the art.

In the operation of a plant such as that for the manufacture of ammonium nitrate prills, operating conditions such as flow rates, temperature and the like are usually maintained as constant as is practical; therefore manual control of the temperature drop through the various stages or zones is possible and has been practiced successfully.

The temperature of the prills leaving the prilling tower will preferably be maintained at some temperature below 84° C., for example, in the range of about 60 to 80° C. The air introduced into the initial dryers will be heated to about 80 to 125° C., depending upon the quantity of air utilized and upon the temperature, moisture content and quantity of the prills.

The invention has been described as applied to the drying of ammonium nitrate prills; however, the invention is applicable to the simultaneous drying and cooling of any hot, granular solid which contains moisture.

That which is claimed is:

1. In the production of ammonium nitrate prills wherein molten ammonium nitrate, containing about 3 to 6 percent water, is sprayed into the top of a prilling tower countercurrent to a flow of cooling gas, the improvement which comprises collecting the prills at the bottom of the tower; passing the prills serially through a plurality of drying zones; passing air through each of said drying zones in an amount sufficient and at a temperature sufficient to reduce the temperature of the prills about 2 to 10° C. in each drying zone; and recovering dried prills from the last of said drying zones.

2. The process of claim 1 wherein the prills collected at the bottom of the prilling tower are passed to a first drying zone at a temperature in the range of about 60 to 75° C.; a sufficient amount of heated air is passed through said first drying zone and a second drying zone to reduce the temperature of the prills exiting each of said drying zones about 2 to 10° C.; and passing atmospheric air through the remaining drying zones in an amount sufficient to reduce the temperature of the dried prills to about 30° C.

3. A process for drying ammonium nitrate prills received at the bottom of a prilling tower at a temperature of about 60 to 80° C. which comprises passing said prills through a first drying zone in countercurrent flow relationship to a stream of air heated to a temperature of about 80 to 125° C. and in an amount sufficient to reduce the temperature of the prills about 5 to 10° C.; passing the prills through a second drying zone in countercurrent flow relationship to a stream of air heated to a temperature of about 60° C. and in an amount sufficient to reduce the temperature of the prills about 2 to 10° C.; and passing the prills through a cooling zone in countercurrent flow relationship to a stream of atmospheric air in an amount sufficient to reduce the temperature of the prills to about atmospheric temperature.

4. In apparatus for drying ammonium nitrate prills received from a prilling tower comprising a plurality of dryer vessels, means to pass prills serially through said vessels and means to pass drying gas through each of said vessels at a temperature sufficient to reduce the temperature of the prills in each vesesl about 2 to 10° C., the combination therewith of means to measure the temperature of the prills entering each vessel; means to measure the temperature of the prills exiting each vessel; and means responsive to the entering and exiting prill temperature of each vessel to decrease the amount of drying gas passed through each vesesl when the difference between the entering prill temperature and the exiting prill temperature is less than a predetermined value and to increase the amount of drying gas passed through each vessel when the difference between the entering prill temperature and the exiting prill temperature exceeds said predetermined value.

5. In apparatus for drying hot granular solids containing moisture comprising a plurality of drying vessels, means to pass the solids serially through said vessels and means to pass a drying gas through each of said vessels individually at a temperature sufficient to reduce the temperature of the prills in each vessel about 2 to 10° C., the combination therewith of flow control means to control the amount of drying gas passing to each vessel; temperature sensing means to measure the temperature of the solids entering and exiting each vessel; differential temperature measuring means to measure the difference in temperature of the solids entering and exiting each vessel operatively connected to said temperature sensing means; and means operatively connected to said differential temperature measuring means and to said flow control means to vary the amount of drying gas passing through each vessel in response to the temperature difference of the solids entering and exiting each of said vessels.

References Cited by the Examiner

UNITED STATES PATENTS

| 2,402,192 | 6/1946 | Williams | 34—13 |
| 2,653,391 | 9/1953 | Edmunds | 34—13 |
| 2,767,484 | 10/1956 | Gilson | 34—54 |
| 2,798,301 | 7/1957 | Antle | 34—28 |
| 3,013,785 | 12/1961 | King | 34—48 X |

JOHN J. CAMBY, *Acting Primary Examiner.*

NORMAN YUDKOFF, WILLIAM F. O'DEA,
*Examiners.*

W. C. EVERETT, D. A. TAMBURRO,
*Assistant Examiners.*